United States Patent Office 3,147,249
Patented Sept. 1, 1964

---

3,147,249
17α,21-SUBSTITUTED METHYLENEDIOXY STEROIDS AND METHODS THEREFOR
Alberto Ercoli and Rinaldo Gardi, Milan, Italy, assignors to Francesco Vismara S.p.A., Casatenovo (Como), Italy, a corporation of Italy
No Drawing. Filed June 11, 1962, Ser. No. 201,295
Claims priority, application Italy June 13, 1961
15 Claims. (Cl. 260—239.55)

This invention relates to new 17α,21-cyclic orthoesters of steroids and particularly to 17α,21-(1'-alkoxy)-1'-substituted methylenedioxy steroids of the pregnane series and to methods for their preparation.

The new pregnane derivatives of this invention are characterized by having at the 17, 20 and 21-positions the structure:

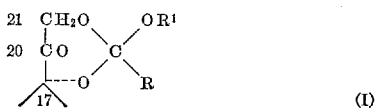
(I)

where R is a member selected from the group consisting of aliphatic hydrocarbon radicals containing from 1 to 9 carbon atoms, cycloaliphatic hydrocarbon radicals of from 4 to 6 carbon atoms, arylaliphatic hydrocarbon radicals of 7 and 8 carbon atoms, phenyl, a β-carboxy-ethyl group, a β-carbomethoxy-ethyl group and a β-carboethoxy-ethyl group and $R^1$ represents a lower alkyl radical of from 1 to 3 carbon atoms.

Preferred compounds of this invention are those in which R represents an aliphatic hydrocarbon radical of from 1 to 6 carbon atoms and particularly preferred are the 17α,21-(1'-lower alkoxy)-pentylidenedioxy derivatives.

In the compounds of this invention the cyclopentanopolyhydrophenanthrene nucleus which is not shown in the above formula is generally substituted at the 3-position with an oxygenated function, such as a ketonic oxygen or a hydroxy group. If a hydroxy group is present it may be protected in the form of an ether group containing a lower alkyl radical of from 1 to 3 carbon atoms or in the form of an ester group containing a lower alkanoyl radical, of from 1 to 3 carbon atoms or a benzoyl radical. Other substituents, such as hydroxy, keto, halogen, ether and methyl groups, may be also contained at other positions of the cyclopentanopolyhydrophenanthrene nucleus, as for instance at positions 1, 2, 4, 6, 7, 9, 11, 16. The steroid may be completely saturated or have one or more double bonds, as for instance in the 1:2, 3:4, 4:5, 5:6 and/or 9:11 positions of the molecule.

Preferred 17α,21-(1'-alkoxy)-1'-substituted methylenedioxy steroids are those containing a double bond in the 4:5 or 1:2 and 4:5 positions, a keto group at the 3-position, a keto group or a hydroxy group at the 11 position and, coupled with the 11β-hydroxy group a halogen, particularly fluorine, at the 9-position. Other substituents may occur at 6 or 16 positions.

These compounds may be represented by the following structural formula:

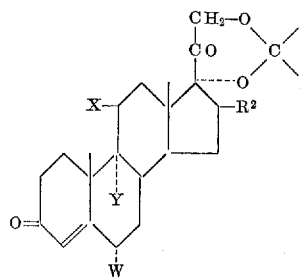
(II)

where R and $R^1$ are as defined above, X represents ketonic oxygen or a hydroxy group β-oriented, Y is hydrogen or fluorine, W is hydrogen, fluorine or methyl and $R^2$ is hydrogen, an α- or β-methyl group or an α-hydroxy group, and 1:2 unsaturated derivatives thereof.

The new 17α,21-(1'-alkoxy)-1'-substituted methylenedioxy derivatives of this invention are obtained by treating a 17α,21-dihydroxy-20-keto steroid with an orthoester of the formula:

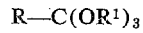

in which R and $R^1$ are as defined above, in the presence of an acid catalyst and in solution in an appropriate organic solvent. Preferred solvents are dimethylformamide, benzene, hexane, isooctane or halogenated solvents, such as chloroform and carbon tetrachloride. The acid catalysts of the reaction may be selected from sulfonic aromatic acids, for instance, toluen-, benzen-, or naphthalensulfonic acid, Lewis acids, such as $SnCl_4$ or $SbCl_5$ and salts of organic bases with mineral acids, particularly pyridine hydrochloride.

The orthoester employed for the reaction is preferably a methyl- or ethylester of an orthocarboxylic acid. Exemplary of these ortho-acids are: ortho-acetic, ortho-propionic, ortho-butyric, ortho-isobutyric, ortho-valeric, ortho-iso-valeric, ortho-caproic, ortho-oenanthic, ortho-caprylic, ortho-pelargonic, ortho-capric, ortho-cyclobutanoic, ortho-cyclopentanoic, ortho-hexahydrobenzoic, ortho-benzoic, ortho-β-phenylpropionic, ortho-β-carbomethoxypropionic and ortho-β-carboethoxypropionic.

These compounds are generally well known in the literature. They can be easily prepared according to the Pinner method (Ber. 16, 1643; 1883) by treating a nitrile of formula R—CN, where R is as defined above, with an alcohol of the formula $R^1OH$, where $R^1$ is as defined above, and preperably with methanol or ethanol, by passing through the corresponding imido ether hydrochloride. The 17α,21-dihydroxy-20-ketosteroid, starting material, may be completely saturated or have one or more double bonds as indicated above. It may contain functional groups at the various positions of the cyclopentanopolyhydrophenanthrene nucleus and specifically the substituents mentioned above. However it is preferred to exclude from the reaction with the desired orthoester a 17α,21-dihydroxy-20-ketosteroid containing a free hydroxy group at the 16-position. Other substituents at the 16-position or free hydroxy groups at other positions of the steroid nucleus do not interfere with the process for converting a 17α,21-dihydroxy steroid to the corresponding 17α,21-(1'-alkoxy)-1'-substituted methylenedioxy derivative.

Exemplary of 17α,21-dihydroxy-20-ketosteroids starting material are:

4-pregnene-17α,21-diol-3,20-dione
4-pregnene-11β,17α,21-triol-3,20-dione
4-pregnene-17α,21-diol-3,20-dione
1,4-pregnadiene-11β,17α,21-triol-3,20-dione
4,6-pregnadiene-17α,21-diol-3,11,20-trione
1-pregnene-17α,21-diol-3,11,20-trione
9α-fluoro-1,4-pregnadiene-11β,17α,21-triol-3,20-dione
4α-chloro-5α-pregnane-17α,21-diol-3,20-dione
4α-bromo-5α-pregnane-17α,21-diol-3,20-dione
16β-bromo-4-pregnene-17α,21-diol-3,20-dione
16β-bromo-4-pregnene-17α,21-diol-3,11,20-trione
5α-pregnane-3,17α,21-triol-20-one
3β-ethoxy-5α-pregnane-17α,21-diol-20-one
5-pregnene-3β,17α,21-triol-20-one 3-benzoate
5α-pregnane-17α,21-diol-3,11,20-trione
5α-pregnane-11β,17α,21-triol-3,20-dione
4,9(11)-pregnadiene-17α,21-diol-3,20-dione
5α-pregnane-4α,17α,21-triol-3,20-dione 4-pregnene-17α,21-diol-3,11,20-trione
5α-pregnane-3α,17α,21-triol-20-one 3-formate
5α-pregnane-3α,17α,21-triol-20-one 3-acetate
3-propoxy-5α-pregnane-17α,21-diol-20-one
6α-methyl-1,4-pregnadiene-11β,17α,21-triol-3,20-dione
6α-fluoro-1,4-pregnadiene-11β,17α,21-triol-3,20-dione
6α-methyl-4-pregnene-17α,21-diol-3,11,20-trione
6α-fluoro-4-pregnene-17α,21-diol-3,11,20-trione
19-nor-4-pregnene-11β,17α,21-triol-3,20-dione
4-pregnene-6,17α,21-triol-3,20-dione
16β-methyl-1,4-pregnadiene-11β,17α,21-triol-3,20-dione
9α - fluoro - 16β - methyl - 1,4 - pregnadiene - 11β,17α,21-triol-3,20-dione
9α - fluoro - 1,4 - pregnadiene - 11β,16α,17α,21 - tetrol-3,20-dione 16-acetate
9α - fluoro - 16β - methyl - 1,4 - pregnadiene - 11β,16α,2α-methyl-4-pregnene-17α,21-diol-3,11,20-trione.

The reaction of a 17α,21-dihydroxy-20-ketosteroid with the desired orthoester may be carried out at a temperature from about 60° C. to about 130° C., preferably between 75° and 115° C., for a period of from 30 minutes to 4 hours. The most satisfactory yields of 17α,21-(1'-alkoxy)-1'-substituted methylenedioxy steroids are realized by carrying out the reaction in an apparatus equipped with a descending condenser. A portion of the solvent is distilled off and the remaining solution is neutralized by addition of a few drops of pyridine. The 17α,21-(1'-alkoxy)-1'-substituted methylenedioxy steroids are then obtained by concentration of the reaction mixture to dryness in vacuo followed by recrystallization of the product in the usual manner.

If the resulting steroid derivative contains a bromine atom in the 16-position, it can be submitted, if desired, to a further step in order to replace the bromine atom with a hydroxy group. This is readily accomplished by treating the 17α,21-(1'-alkoxy)-1'-substituted methylene-dioxy-16β-bromo steroid with silver acetate in the presence of sodium acetate according to known procedures (see, for example, J. Am. Chem. Soc. 82, 504; 1960), thus obtaining the corresponding 17α,21-(1'-alkoxy)-1'-substituted methylenedioxy-16β-acetoxy derivative.

Since the new compounds of this invention are stable under basic conditions, they can be submitted, if desired, to alkaline treatments in order to convert by hydrolysis the esterified hydroxy groups present in the steroid nucleus to free hydroxy groups. Thus, for example, the above mentioned 17α,21-(1'-alkoxy)-1'-substituted methylenedioxy-16β-acetoxy steroid is reacted with potassium carbonate to give, by simultaneous hydrolysis and epimerization at the 16-position, the corresponding 17α,21-(1'-alkoxy)-1'-substituted methylenedioxy-16α-hydroxy derivative.

Similarly a 17α,21-(1'-alkoxy)-1'-substituted methylenedioxy-16α-hydroxy steroid, such as for instance, 17α,21 - (1' - methoxy) - pentylidenedioxy - 9α - fluoro - 1,4-pregnadiene-11β,16α-diol-3,20-dione, can be obtained by alkaline hydrolysis of the corresponding 16α-acetoxy derivative. The 16α-acetoxy-17α,21-dihydroxy steroid, starting material for the reaction with a lower alkyl ester of the desired orthocarboxylic acid, may be obtained in turn by acetylating with acetic anhydride in pyridine the 16α,17α,21-trihydroxy steroid-21-hemisuccinate and selectively hydrolyzing the 16α-acetate-21-hemisuccinate thus obtained with magnesium hydroxide according to a method described by us in Gazz. Chim. Ital. 89, 1382; 1959.

The new 17α,21-(1'-alkoxy)-1'-substituted methylenedioxy steroids of this invention, being stable under basic conditions, could be employed for the same purposes as the corresponding 17α,21-(1'-alkoxy)-methylenedioxy derivatives, disclosed in our copending application Serial No. 201,296, filed on June 11, 1962, that is to afford protection for the dihydroxy-acetone side chain when it is desired that certain reactions, such as a Claisen condensation, be performed on the steroid nucleus without modification of the dihydroxy-acetone moiety. However, while the 17α, 21-(1'-alkoxy)-methylenedioxy derivatives can be easily cleaved by short treatment with a mineral acid in hot methanol to re-establish the dihydroxy-acetone side chain, the new 17α,21-(1'-alkoxy)-1'-substituted methylenedioxy derivatives of this invention cannot regenerate the free dihydroxyacetone function, even under strong acid conditions. We have found that the new 17α,21-(1'-alkoxy)-1'-substituted methylenedioxy steroids are quantitatively converted by treatment with mineral acids, even concentrated, to the corresponding new 17α-monoesters of 17α,-21-dihydroxy steroids. Therefore the new compounds of this invention are particularly useful for the preparation of the 17α-monoesters. This process of hydrolyzing the 17α,21-(1'-alkoxy)-1'-substituted methylenedioxy derivatives to obtain a selective esterification of the 17α-hydroxy group of a 17α,21-dioxy steroid is more fully described in our copending application Serial No. 201,297, filed on June 11, 1962.

In addition to their utility as intermediates for the preparation of the 17α-monoesters, the 17α,21-(1'-alkoxy)-1'-substituted methylenedioxy steroids represented by the Formula II above are also useful for their remarkable anti-inflammatory properties. In particular, the 17α,21-cyclic orthoesters of cortisone, cortisol, prednisone and prednisolone in which the 1'-substituent is an alkyl group of from 1 to 6 carbon atoms, exhibit an anti-inflammatory activity several times higher than the parent hormones. For instance, 17α,21-(1'methoxy)-pentylidenedioxy-1,4-pregnadiene-11β-ol-3,20-dione has been found to be at least seventy times more effective than prednisolone itself. These compounds can be used in the treatment of rheumatic and cutaneous diseases.

The following examples are illustrative of the products and methods of this invention, but are not to be construed as limiting.

*Example 1*

A mixture of 2 g. of 4-pregnene-17α,21-diol-3,20-dione (Compound S), 4 mg. of p-toluensulfonic acid and 800 cc. of benzene is introduced into a flask equipped with a descending condenser and distilled for a few minutes to remove any possible trace of moisture.

To the resulting mixture there are added dropwise 1.5 cc. of methyl orthoacetate (prepared as described by P. P. T. Sah., J.A.C.S. 50, 516; 1928). The distillation is continued until the volume is reduced to 250 cc. whereupon a few drops of pyridine are added to neutralize the p-toluensulfonic acid The solution is evaporated to dryness under vacuum and the residue on crystallization from methanol consists of 17α,21-(1'-methoxy)-ethylidenedioxy-4-pregnene-3,20-dione, M. Pt. 176–178° C.; [α]$_D$=+91.5° (dioxan).

*Example 2*

1.5 g. of 4-pregnene-17α,21-diol-3,20-dione (Compound S) are suspended in 1.5 cc. of dimethylformamide with 4 mg. of p-toluensulfonic acid. Then 1.5 cc. of methyl orthovalerate (prepared as described by Brooker and White, J.A.C.S. 57, 2480; 1935), are added dropwise to the mixture which is heated to 110° C. for approximately 30 minutes. A few drops of pyridine are added and the solvent is evaporated in vacuo. The solid residue is taken up with ethanol, filtered and recrystallized from ethanol to obtain 17α,21-(1'-methoxy)-pentylidenedioxy-4-pregnene-3,20-dione, M. Pt. 136–139° C.; [α]$_D$=+72° (dioxan).

*Example 3*

2.5 g. of 4-pregnene-17α,21-diol-3,20-dione and 5 mg. of benzensulfonic acid are suspended in 900 cc. of benzene. The resulting mixture is heated and distilled for a few minutes, then it is treated with 2 cc. of methylorthocaproate (prepared as described by Brooker and White, J.A.C.S. 57, 2480; 1935). Following the procedure described in Example 1, 17α,21-(1'-methoxy)-hexylidenedioxy-4-pregnene-3,20-dione is obtained, M. Pt. 129–131° C.; [α]$_D$=+71.5° (dioxan). In the same manner as above, by substituting of methyl ortho β-carbomethoxy-propionate (prepared as described by McElvain and Schroeder, J.A.C.S 71, 40; 1949), for methyl orthocaproate, 17α,21 - (1' - methoxy-3'-carbomethoxy)-propylidenedioxy-4-pregnene-3,20-dione is prepared, melting point: 145–147° C.; $[\alpha]_D = +70°$ (dioxan).

Example 4

A suspension of 2 g. of 17α,21-(1'-methoxy-3'-carbomethoxy) - propylidenedioxy-4-pregnene-3,20-dione (obtained as described in Example 3) in 100 cc. of methanol and 14 cc. of a 10% solution of potassium carbonate are heated to reflux on a water-bath for 3 hours. Most of the solvent is eliminated under vacuum, then the mixture is taken up with water and 6 cc. of 10% acetic acid are added to neutralize the excess of potassium carbonate. The solution is poured onto ice, treated with 10 cc. of 10% hydrochloric acid and extracted with methylene chloride.

By evaporating the solvent, an oily residue is obtained which, taken up with methanol, yields 17α,21-(1'-methoxy - 3' - carboxy) - propylidenedioxy - 4-pregnene-3,20-dione.

Example 5

Following the same procedure as in Example 1 and substituting 4-pregnene-17α,21-diol-3,20-dione by 4,9(11)-pregnadiene - 17α,21-diol-3,20-dione, the corresponding 17α,21 - (1' - methoxy)-ethyl-idenedioxy-4,9(11)-pregnadiene-3,20-dione is obtained, M. Pt. 176–177.5° C; $[\alpha]_D = +65.5°$ (dioxan).

Example 6

To 1000 cc. of anhydrous toluene, 3 g. of 4-pregnene-17α,21-diol-3,11,20-trione (cortisone) and 5 mg. of sulphosalicylic acid are added. The resulting mixture is distilled for a few minutes and treated, drop by drop, with 2 cc. of methyl orthoacetate. The distillation is continued until the volume is reduced to about 250 cc. The resulting solution is then neutralized with pyridine and evaporated in vacuo to a residue which, taken up with methanol, yields a solid which is recrystallized from methanol-methylene chloride to give 17α,21-(1'-methoxy)-ethylidenedioxy-4-pregnene-3,11,20-trione, M. Pt. 210–214°; $[\alpha]_D = +150°$ (dioxan).

Example 7

2 g. of 4-pregnene-17α,21-diol-3,11,20-trione (cortisone) are suspended in 800 cc. of benzene with 4 mg. of pyridine hydrochloride. The mixture is distilled for a few minutes and then treated with 1.5 cc. of methyl orthovalerate. The distillation is continued and the volume reduced to 200 cc. After addition of a few drops of pyridine, the solvent is evaporated in vacuo. The residue on crystallization from methanol consists of 17α,21-(1'-methoxy)-pentylidenedioxy - 4 - pregnene-3,11,20-trione melting at 163–165° C.; $[\alpha]_D = +126°$ (dioxan).

Similarly, by substituting methyl-orthocaproate (prepared as described by Brooker and White, J.A.C.S. 57, 2480; 1935), for methyl orthovalerate, 17α,21-(1'-methoxy)-hexylidenedioxy-4-pregnene-3,11,20-trione melting at 119–120° C.; $[\alpha]_D = +123°$ (dioxan) is prepared.

Example 8

To a suspension of 1 g. of 4-pregnene-11β,17α,21-triol-3,20-dione (cortisol) in 500 cc. of benzene are added 2 mg. of p-toluensulfonic acid. The resulting reaction mixture is distilled in order to remove any trace of moisture and 1 cc. of methyl orthoacetate is added. After distillation in vacuo a solid separates which by recrystallization from ethanol gives 17α,21-(1'-methoxy)-ethylidenedioxy-4 - pregnene - 11β - ol - 3,20-dione, M. Pt. 222–224° C.; $[\alpha]_D = +116°$ (dioxan).

Example 9

To 1.5 g. of 4-pregnene-11β,17α,21-triol-3,20-dione (cortisol) dissolved in 600 cc. of anhydrous benzene, 4 mg. of naphthalene sulfonic acid are added. The mixture is distilled for a few minutes and reacted with 1.5 cc. of methyl orthovalerate. The heating is continued until the volume of the solution is reduced to 150 cc. The naphthalenesulfonic acid is neutralized with a few drops of pyridine and the liquid evaporated in vacuo. The residue taken up with methanol-methylene chloride yields 17α,21 - (1' - methoxy) - pentylidenedioxy - 4 - pregnene-11β-ol-3,20-dione, M. Pt. 184–186° C.; $[\alpha]_D = +101°$ (dioxan).

A similar reaction carried out with propyl orthovalerate yields 17α,21-(1'-propoxy)-pentylidenedioxy-4-pregnene-11β-ol-3,20-dione melting at 200–205° C.; $[\alpha]_D = +102°$ (dioxan).

Example 10

A mixture of 3 g. of 1,4-pregnadiene-17α,21-diol-3,11,20-trione (prednisone), 5 mg. of p-toluenesulfonic acid and 3 cc. of dimethylformamide is reacted with 4 cc. of methyl orthoacetate. The resulting mixture is treated following the same procedure as in Example 2 to prepare 17α,21-(1'-methoxy)-ethylidene-1,4-pregnadiene-3,11,20-trione, M. Pt. 226–228° C.; $[\alpha]_D = +138°$ (dioxan).

Similarly, 17α,21-(1'-ethoxy)-ethylidenedioxy-1,4-pregnadiene-3,11,20-trione, melting at 192–194° C.; $[\alpha]_D = +132°$ (dioxan) is obtained.

Example 11

1.2 g. of 1,4-pregnadiene-17α,21-diol-3,11,20-trione (prednisone) in 500 cc. of toluene are mixed with 3 mg. of sulphosalicylic acid. The mixture is distilled, 1 cc. of methyl orthovalerate is added and the volume reduced to 100 cc. Then a few drops of triethylamine are added to neutralize the sulphosalicylic acid and the solvent eliminated in vacuo. The residue crystallized from methanol yields 17α,21-(1'-methoxy)-pentylidenedioxy-1,4-pregnadiene-3,11,20-trione, M. Pt. 200–203° C.; $[\alpha]_D = +114°$ (dioxan).

In the same manner as above, but employing methyl ortho β-carbomethoxy-propionate instead of methyl orthovalerate, 17α,21-(1'-methoxy-3'-carbomethoxy)-propylidenedioxy-1,4-pregnadiene-3,11,20-trione is prepared. The latter compound, dissolved in methanol, is hydrolised following the procedure described in Example 4, to obtain 17α,21 - (1' - methoxy - 3' - carboxy) - propylidenedioxy-1,4-pregnadiene-3,11,20-trione.

Example 12

To a moisture-free solution of 4 g. of 1,4-pregnadiene-11β,17α,21-triol-3,20-dione (prednisolone) in 1200 cc. of benzene, there is added 5 mg. of p-toluenesulfonic acid and 3 cc. of methyl orthoacetate. The mixture is distilled to reduce the volume to 300 cc., and, after addition of pyridine, the liquid is completely evaporated under vacuum to obtain a solid residue. Upon crystallization from methylene-methylene chloride there is obtained 17α,21-(1' - methoxy) - ethylidenedioxy - 1,4 - pregnadiene-11β-ol-3,20-dione, M. Pt. 191–193° C.; $[\alpha]_D = +83°$ (dioxan).

Similarly, 17α,21 - (1'-methoxy)-pentylidenedioxy-1,4-pregnadiene-11β-ol-3,20-dione, M. Pt. 157–159° C.; $[\alpha]_D = +64°$ (dioxan) and 17α,21-(1'-methoxy)-hexylidenedioxy-1,4-pregnadiene-11β-ol-3,20-dione, M. Pt. 137–141° C.; $[\alpha]_D = +62°$ (dioxan) are prepared.

Example 13

A solution of 1.5 g. of 1,4-pregnadiene-11β,17α,21-triol-3,20-dione and 4 mg. of pyridine hydrochloride in 600 cc. of carbon tetrachloride is distilled to remove any trace of moisture. The resulting mixture is treated with 1.5 cc. of methyl ortho-oenanthate, Kp.725 190–192° C. (prepared following the method described by Pinner Ber. 16, 1643; 1883). Following the same procedure as in Example 12, 17α,21-(1'-methoxy)-heptylidenedioxy-1,4-pregnadiene-11β-ol-3,20-dione melting at 148–151° C.; [α]<sub>D</sub>=+62° (dioxan) is obtained.

Similarly, 9α-fluoro-17α,21-(1'-methoxy)-ethylidenedioxy-1,4-pregnadiene-11β-ol-3,20-dione, M. Pt. 220–222° C.; [α]<sub>D</sub>=+78° (dioxan), and 9α - fluoro - 17α,21 - (1' - methoxy) - pentylidenedioxy-1,4-pregnadiene - 11β - ol-3, 20-dione, M. Pt. 213–215° C.; [α]<sub>D</sub>=+63° (dioxan) are prepared.

*Example 14*

By treating 1.5 g. of 9α-chloro-1,4-pregnadiene-11β,17α,21-triol-3,20-dione, with 1.2 cc. of methyl ortho-β-phenyl-propionate under the same conditions as described in Example 13,9α-chloro-17α,21-(1'-methoxy)-β-phenyl-propylidenedioxy - 11β - ol-1,4-pregnadiene-3,20-dione is obtained.

Similarly, 9α - bromo-17α,21-(1'-methoxy)-hexahydrobenzylidenedioxy - 11β - ol - 1,4-pregnadiene-3,20-dione is prepared.

*Example 15*

Reacting 6 g. of 1,4-pregnadiene-11β,17α,21-triol-3,20-dione and 8 mg. of benzensulphonic acid, dissolved in 1500 cc. of benzene, with 4.5 cc. of methyl ortho-β-carbomethoxy-propionate and following the same procedure as in Example 1, 17α,21-(1'-methoxy-3'-carbomethoxy)-propylidenedioxy-1,4-pregnadiene-11β-ol-3,20-dione is isolated, M. Pt. 153–156° C.; [α]<sub>D</sub>=+61° (dioxan).

By submitting this compound to hydrolysis as described in Example 4, 17α,21-(1'-methoxy-3'-carboxy)-propylidenedioxy-1,4-pregnadiene-11β-ol-3,20-dione, melting at 160–162° C.; [α]<sub>D</sub>=+57° (dioxan), is obtained.

*Example 16*

Into a solution of 0.5 g. of 5α-dihydrocortisone and tin tetrachloride in 200 cc. of benzene, previously distilled in order to remove any possible trace of moisture, there is added dropwise 1 cc. of methyl ortho-acetate. The resulting mixture is treated as described in Example 1 and the solid residue obtained on crystallization from ethanol consists of 17α,21-(1'-methoxy)-ethylidenedioxy-5α-pregnane-3,11,20-trione, M. Pt. 208–212° C.; [α]<sub>D</sub>=+57° (dioxan).

Following the same procedure as above and substituting the 5α-dihydrocortisone by the 5α-dihydrocortisol, 17α,21 - (1' - methoxy) - ethylidenedioxy - 5α - pregnane-11β-ol-3,20-dione melting at 218–221° C.; [α]<sub>D</sub>=+51° (dioxan), is obtained.

*Example 17*

To 1.5 g. of 3β-ethoxy-5α-pregnane-17α,21-diol-20-one dissolved in 600 cc. of isooctane containing 4 mg. of p-toluensulfonic acid are added, after distillation, 1.5 cc. of methyl orthoacetate. The mixture is treated as described in Example 1 and a solid residue separates which on crystallization from ethanol gives 3β-ethoxy-17α,21-(1'-methoxy)-ethylidenedioxy-5α-pregnane-20-one, M. Pt. 173–177° C.; [α]<sub>D</sub>=+20.5° (dioxan).

Similarly, 17α,21 - (1'-methoxy) - ethylidenedioxy - 5α-pregnane-3β-ol-20-one 3-formate and 17α,21-(1'-methoxy)-ethylidenedioxy-5α-pregnane-3β-ol-20-one 3 acetate are prepared.

*Example 18*

2 g. of 6α-methyl-1,4-pregnadiene-17α,21-diol-3,11,20-trione suspended in 800 cc. of moisture-free carbon tetrachloride containing 4 mg. of SbCl<sub>5</sub> are treated with 1.5 cc. of methyl orthocrotonate (prepared according to the Pinner method Ber. 16, 1643; 1883), and the solution is distilled. Then a few drops of pyridine are added and the solvent is evaporated in vacuo. The residue crystallized from methanol yields 6α-methyl-17α,21-(1'-methoxy)-crotylidenedioxy-1,4-pregnadiene-3,11,20-trione.

In the same manner 2α-methyl-17α,21-(1'-methoxy)-butylidenedioxy-4-pregnene - 3,11,20 - trione, 17α,21 - (1'-ethoxy)-isobutylidenedioxy-1-pregnene-3,11,20-trione and 17α,21 - (1' - propoxy) - decylidenedioxy - 4,6 - pregnadiene-3,11,20-trione are prepared.

*Example 19*

5 g. of 16β-methyl-1,4-pregnadiene-11β,17α,21-triol-3,20-dione in 1500 cc. of toluene are treated with 6 mg. of p-toluensulfonic acid and 4.5 cc. of ethyl orthopelargonate (prepared following the Pinner method Ber. 16, 1643; 1883). Following the procedure described in Example 1, 16β - methyl - 17α,21-(1'-ethoxy)-nonylidenedioxy-1,4-pregnadiene-11β-ol-3,20-dione is obtained.

Similarly there is prepared

17α,21-(1'-ethoxy-1'-cyclopentyl)-methylenedioxy-4-pregnene-6β-ol-3,20-dione;
16α-methyl-17α-21-(1'-methoxy-3'-phenyl)-propylidenedioxy-1,4-pregnadiene-11β-ol-3,20-dione;
4α-chloro-17α,21-(1'-ethoxy-benzylidenedioxy-5α-pregnane-3,20-dione;
4α-bromo-17α,21-(1'-propoxy)-iso-pentylidenedioxy-5α-pregnane-3,20-dione.

*Example 20*

The same procedure as described in Example 2 is carried out in order to obtain the following compounds:

17α,21-(1'-methoxy)-crotylidenedioxy-5α-pregnane-4α-ol-3,20-dione;
6α-fluoro-17α,21-(1'-ethoxy)-hexylidenedioxy-1,4-pregnadiene-11β-ol-3,20-dione;
9α-fluoro-16β-methyl-17α,21-(1'-iso-propoxy)-octylidenedioxy-4-pregnene-3,11,20-trione;
17α,21-(1'-propoxy)-crotylidenedioxy-4-pregnene-6β-ol-3,20-dione;
6β-methyl-17α,21-(1'-ethoxy)hexahydrobenzylidenedioxy-1,4-pregnadiene-11β-ol-3,20-dione;
9α-fluoro-16β-methyl-17α,21-(1'-iso-propoxy)-octylidenedioxy-1,4-pregnadiene-11β-ol-3,20-dione;
9α-chloro-17α,21-(1'-methoxy)-heptylidenedioxy-4-pregnene-11β-ol-3,20-dione;
19-nor-17α,21-(1'-ethoxy)-ethylidenedioxy-4-pregnene-11β-ol-3,20-dione.

*Example 21*

2 g. of triamcinolone 21-hemisuccinate (J. Pharm. Sciences 50, 866; 1961), is treated with 0.5 cc. of acetic anhydride in 3 cc. of pyridine solution at room temperature to give 9α-fluoro-1,4-pregnadiene-11β,16α,17α,21-tetraol-3,20-dione 16-acetate 21-hemisuccinate. The product (1.5 g.) is reacted with magnesium hydroxide in disodium phosphate solution and the resulting triamcinolone 16-monoacetate is treated with methyl orthovalerate as in Example 2 to give 17α,21-(1'-methoxy)-pentylidenedioxy - 9α - fluoro - 1,4 - pregnadiene-11β,16α-diol-3,20-dione 16-acetate. Hydrolysis of this latter by heating with potassium carbonate in dilute methanol solution provides 17α,21-(1'-methoxy)-pentylidenedioxy-9α-fluoro-1,4-pregnadiene-11β,16α-diol-3,20-dione.

*Example 22*

1 g. of 16β-bromo-4-pregnene-17α,21-diol-3,20-dione, prepared by acid hydrolysis from the corresponding 21-acetate (obtained in turn as described in J. Am. Chem. Soc. 72, 5145; 1950), is treated with methyl orthoacetate as in Example 1 to give 17α,21-(1'-methoxy)-ethylidenedioxy-16β-bromo-4-pregnene-3,20-dione. This compound (0.6 g.) is dissolved in 20 cc. of dimethylformamide and the solution heated to reflux for two hours with an excess of silver acetate in the presence of sodium acetate to form 17α,21-(1'-methoxy)-ethylidenedioxy-16β-acetoxy-4-pregnene-3,20-dione. This latter by treatment with potassium carbonate in 50 cc. of methanol solution, according to the method described in J. Am. Chem. Soc. 81, 1256; 1959, gives the 17α,21-(1'-methoxy)-ethylidenedioxy-16α-hydroxy-4-pregnene-3,20-dione.

In the same manner the corresponding derivative of 16α-hydroxy cortisone is prepared.

We claim:
1. A compound selected from the group consisting of a steroid compound of the formula:

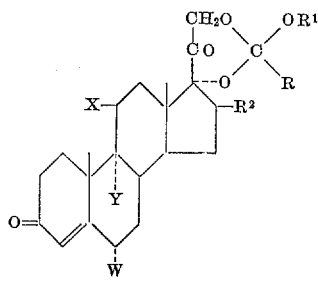

where R is a member selected from the group consisting of aliphatic hydrocarbon radicals of from 1 to 9 carbon atoms, cycloaliphatic hydrocarbon radicals of from 4 to 6 carbon atoms, arylaliphatic hydrocarbon radicals of at least 7 and no more than 8 carbon atoms, phenyl, β-carboxyethyl, β-carbomethoxyethyl and β-carbethoxyethyl, $R^1$ is lower alkyl of from 1 to 3 carbon atoms, $R^2$ is a member selected from the group consisting of hydrogen, α-methyl, β-methyl and α-hydroxy, X is selected from the group consisting of hydrogen, ketonic oxygen and β-hydroxy, Y is selected from the group consisting of hydrogen, fluoro, chloro and bromo, and W is selected from the group consisting of hydrogen, halogen, methyl and hydroxy; and $\Delta^1$-dehydro derivatives of said steroid compound.

2. A compound of the formula:

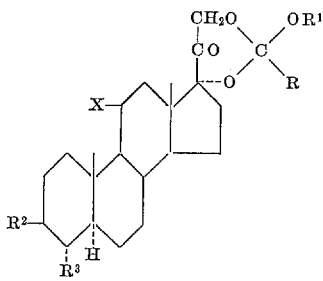

where R is a member selected from the group consisting of aliphatic hydrocarbon radicals of from 1 to 9 carbon atoms, cycloaliphatic hydrocarbon radicals of from 4 to 6 carbon atoms, arylaliphatic hydrocarbon radicals of at least 7 and no more than 8 carbon atoms, phenyl, β-carboxyethyl, β-carbomethoxyethyl and β-carbethoxyethyl, $R^1$ is lower alkyl of from 1 to 3 carbon atoms, $R^2$ is a member selected from the group consisting of oxygen, α-hydroxy, β-hydroxy, lower alkoxy of from 1 to 3 carbon atoms, lower alkanoyloxy of from 1 to 3 carbon atoms and benzoyloxy, $R^3$ is selected from the group consisting of hydrogen, chloro, bromo and hydroxy and X is selected from the group consisting of hydrogen, ketonic oxygen and β-hydroxy.

3. 17α,21 - (1' - methoxy) - ethylidenedioxy - 4,9(11)-pregnadiene-3,20-dione.

4. 17α,21 - (1' - ethoxy) - isobutylidenedioxy - 1 - pregnene-3,11,20-trione.

5. 17α,21 - (1' - propoxy) - decylidenedioxy - 4,6 - pregnadiene-3,11,20-trione.

6. 19 - nor - 17α,21 - (1' - ethoxy) - ethylidenedioxy-4-pregnene-11β-ol-3,20-dione.

7. 17α,21 - (1' - methoxy) - pentylidenedioxy - 9α - fluoro-1,4-pregnadiene-11β,16α-diol-3,20-dione.

8. 17α,21 - (1' - methoxy) - ethylidenedioxy - 4 - pregnene-3,20-dione.

9. 17α,21 - (1' - methoxy) - n - pentylidenedioxy - 4-pregnene-11β-ol-3,20-dione.

10. 17α,21 - (1' - methoxy) - ethylidenedioxy - 1,4-pregnadiene-11β-ol-3,20-dione.

11. 17α,21 - (1' - methoxy) - n - pentylidenedioxy - 1,4-pregnadiene-11β-ol-3,20-dione.

12. 17α,21 - (1' - methoxy) - n - hexylidenedioxy - 1,4-pregnadiene-11β-ol-3,20-dione.

13. 17α,21 - (1' - methoxy - 3' - carboxy) - propylidenedioxy-1,4-pregnadiene-11β-ol-3,20-dione.

14. 17α,21 - (1' - methoxy) - n - pentylidenedioxy - 9α-fluoro-1,4-pregnadiene-11β-ol-3,20-dione.

15. 17α,21 - (1' - methoxy) - n - pentylidenedioxy - 1,4-pregnadiene-3,11,20-trione.

References Cited in the file of this patent

Smith et al.: J.A.C.S., 82, 1960, pp. 4625–4629.
Tanabe et al.: J.A.C.S., 83, February 5, 1961, pp. 756 and 757.

UNITED STATES PATENT OFFICE
CERTIFICATE OF CORRECTION

Patent No. 3,147,249            September 1, 1964

Alberto Ercoli et al.

It is hereby certified that error appears in the above numbered patent requiring correction and that the said Letters Patent should read as corrected below.

Column 2, line 36, for "preperably" read -- preferably --; column 3, line 16, for "9α-fluoro-16β-methyl-1,4-pregnadiene-11β,16α" read -- 9α-chloro-4-pregnene-11β,17α,21-triol-3,20-dione --; column 6, line 22, for "17α,21-(1′-methoxy)-ethylidene" read -- 17α,21-(1′-methoxy)-ethylidenedioxy --; column 8, line 17, for "-(1′-ethoxy-" read -- —(1′-ethoxy)- --.

Signed and sealed this 4th day of May 1965.

(SEAL)
Attest:

ERNEST W. SWIDER            EDWARD J. BRENNER
Attesting Officer            Commissioner of Patents